US006886867B1

(12) United States Patent
Sutton et al.

(10) Patent No.: US 6,886,867 B1
(45) Date of Patent: May 3, 2005

(54) DRAIN HOSE FLUSH SYSTEM

(75) Inventors: Ronald L. Sutton, Sparks, NV (US); Sandra L. Sutton, Sparks, NV (US)

(73) Assignee: Sutton Partnership

( * ) Notice: Subject to any disclaimer, the term of this patent is extended or adjusted under 35 U.S.C. 154(b) by 0 days.

(21) Appl. No.: 10/138,084

(22) Filed: May 3, 2002

(51) Int. Cl.[7] ................................................ F16L 21/00
(52) U.S. Cl. ....................................... 285/401; 285/272
(58) Field of Search ................................ 285/360, 361, 285/401, 402, 276, 272

(56) References Cited

U.S. PATENT DOCUMENTS

| | | | | | |
|---|---|---|---|---|---|
| 290,196 | A | * | 12/1883 | Abel | 285/145.3 |
| 488,624 | A | * | 12/1892 | Brewster | 169/70 |
| 938,297 | A | * | 10/1909 | Arthur | 251/149.9 |
| 1,329,141 | A | * | 1/1920 | Rice | 251/148 |
| 1,437,372 | A | * | 11/1922 | Walters | 137/579 |
| 1,734,966 | A | * | 11/1929 | Elmendorf | 285/138.1 |
| 3,526,547 | A | * | 9/1970 | Shock | 134/22.12 |
| 3,712,331 | A | * | 1/1973 | Otto | 137/355.16 |
| 3,811,462 | A | * | 5/1974 | Feliz | 137/240 |
| 3,936,892 | A | * | 2/1976 | Miller | 4/255.01 |
| 4,133,347 | A | * | 1/1979 | Mercer | 137/240 |
| 4,477,109 | A | * | 10/1984 | Kleuver | 285/361 |
| 4,550,453 | A | * | 11/1985 | Norman | 4/323 |
| 4,736,968 | A | * | 4/1988 | Glegg | 285/121 |
| 4,811,431 | A | * | 3/1989 | Kraverath | 285/261 |
| 4,869,428 | A | * | 9/1989 | Gombar | 239/261 |
| D304,487 | S | | 11/1989 | Hengesbach | |
| D304,490 | S | | 11/1989 | Hengesbach | |
| D325,621 | S | | 4/1992 | Hengesbach | |
| 5,141,017 | A | | 8/1992 | Trottier | |
| 5,588,459 | A | * | 12/1996 | Ellis | 137/239 |
| 5,667,256 | A | * | 9/1997 | Caine | 285/148.23 |
| 6,427,715 | B1 | * | 8/2002 | Brockington et al. | 137/239 |

* cited by examiner

*Primary Examiner*—David Bochna
(74) *Attorney, Agent, or Firm*—Blakely, Sokoloff, Taylor & Zafman

(57) ABSTRACT

A drain hose flush adapter, system, and method of use for cleaning or flushing hoses and tubes such as those used to drain waste water sewage and holding tanks is provided. One end of the adapter may be connected to a source of flushing fluid, and the other end of the adapter may be connected to a waste water drain hose, so that the flushing fluid flows through the adapter and into the hose with minimal leakage. In addition, the connections can be secure enough so that the operator is able to manipulate the hose and complete the flushing, with a low risk of being subject to fluid leaking from the adapter. Thus, for instance, the invention could be used to drain hoses used to drain black and/or gray waste water holding tanks of recreation vehicles, motor homes, travel trailers, campers, airplanes, and boats.

21 Claims, 2 Drawing Sheets

DRAIN HOSE FLUSH SYSTEM

BACKGROUND

1. Field

The invention relates to cleaning a hose or tube. More specifically the invention relates to a system for flushing hoses such as those used to drain the waste water sewage and holding tanks of recreational vehicles.

2. Background

Plumbing for recreational vehicles, motor homes, travel trailers, and campers typically includes plumbing and holding tanks to receive and retain waste water from sinks, bathtubs, showers, and toilets. Generally the waste water is stored in two different types of holding tanks. One type of tank, a gray-water tank, retains waste water from sinks, showers and bathtubs. Another type of tank, a black-water tank, retains waste from toilets. The gray and black water holding tanks are drained periodically, for example, at a "dump station," using a "drainage" or "drain" hose.

To drain the tanks, usually, one end of a flexible drain hose is attached to the black water and/or gray water holding tank drain connector and the other end of the drain hose is connected to a dump station inlet. Once the dump station drain hose is connected to a holding tank, the dump station pump or drainage system is activated to draw, pump, or provide a gravity flow of the contents of the tank through the flexible drain hose and into the dump station inlet. After draining or "pumping" the tank, the drain hose is disconnected from the drain connector and then may be flushed.

For example, to drain the black water tank of a recreational vehicle, a black water drain hose is connected to the three inch main dump outlet connector of the black and gray water tank of the vehicle. Then, the dump station pump system is activated to draw or provide a gravity flow of the contents of the black water tank through the flexible drain hose and into the dump station inlet. The black water drain hose is then disconnected from the main dump outlet and then may be flushed.

Similarly, for instance, to drain the gray water tank of a recreational vehicle, a gray water drain hose is connected to the three inch main dump outlet connector of the black and gray water tanks. Additionally, a gray water drain hose may be connected to a one and-a-half inch gray water dump outlet connector of a gray water tank. After connecting the gray water drain hose to the outlet, the dump station pump system is activated to drain the contents of the tank. The gray water drain hose is then disconnected from the dump outlet and then may be flushed.

However, typical methods and systems for flushing the drain hose can be difficult, messy, unsanitary, and certainly unpleasant. Therefore, what is needed is a system for flushing or cleaning gray water and black water drain hoses that is easy and convenient and does not create a mess.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

The current invention relates to a drain hose flush adapter, system, and method of use for cleaning or flushing hoses and tubes such as those used to drain waste water sewage and holding tanks. For example, the adapter may be removably connected on one end to a source of flushing fluid, and on the other end to a waste water drain hose, so that the flushing fluid flows through the adapter and into the hose with minimal leakage. In addition, the connections can be secure enough so that the operator is able to manipulate the hose and complete the flushing quickly and conveniently, with less chance of risking an unsanitary and unpleasant mess. Thus, for instance, the invention could be used to simplify flushing of drain hoses used to drain black and/or gray water holding tanks that receive and retain waste water from sinks, bathtubs, showers, and toilets of recreation vehicles, motor homes, travel trailers, campers, airplanes, and boats.

Herein the terms "flush", "clean", and "rinse" are used interchangeably. Moreover, the terms "drain" and "drainage" are used interchangeably herein. In addition, the terms "hose", "flexible hose", "accordion type hose", "tube", "flexible tube", "accordion type tube" are used interchangeably herein. Also, herein the terms "removably" and "demountably" are used interchangeably.

Examples of implementations of the invention in specific settings will be described below. Those skilled in the art will appreciate that the examples given can be readily adapted, in each case, to various situations, areas, spaces, settings and locations as desired.

Figure 1:
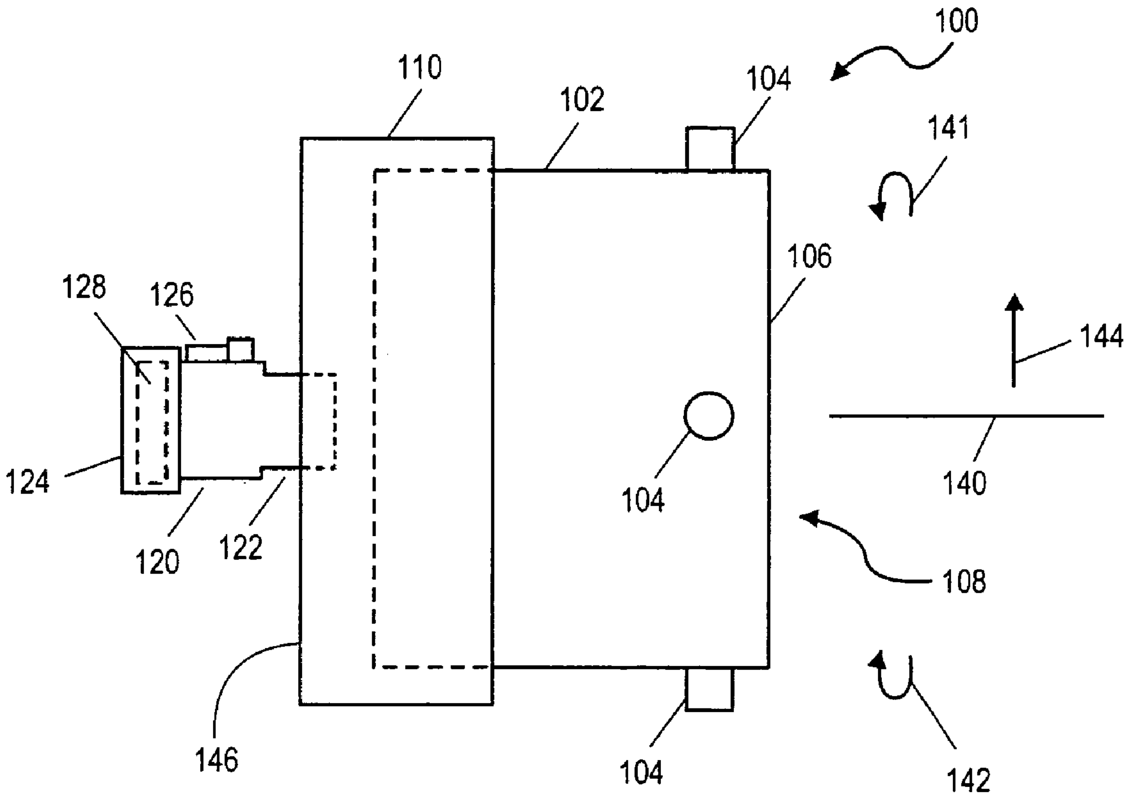
FIG. 1 is an illustration of a drain hose flush adapter for providing a flow of flushing fluid in line with the axis of a connected drain hose.

FIG. 1 is an illustration of a drain hose flush adapter for providing a flow of flushing fluid in line with the axis of a connected drain hose. As shown in FIG. 1, drain hose flush adapter 100 includes drain hose connector 102 coupled to flushing fluid connector 120 via intermediate portion 110. Also, according to embodiments, a drain hose connector (e.g., 102) may be coupled to a flushing fluid connector (e.g., 120) via intermediate portions or connections having various shapes, sizes and lengths. For instance, a wide drain hose connector may be coupled to a narrow flushing fluid connector via an intermediate portion that tapers down from the wider drain hose connector towards the more narrow flushing fluid connector. Also, a drain hose connector may be coupled to a flushing fluid connector via an intermediate portion that is bent so that the axis of the drain hose connector is oriented at an angle with respect to the axis of the flushing fluid connector. Additionally, a drain hose connector may be coupled to a flushing fluid connector via an intermediate portion that via an intermediate portion that is attached to the inside of the drain hose connector and/or is attached to the inside of the flushing fluid connector. Moreover, according to embodiments, a drain hose connector may be directly coupled to flushing fluid connector. As an example, drain hose connector 102 may include a distal end to couple to the drain hose and a proximal end (e.g., such as proximal end 146, shown perpendicular to axis 140 of a hose attached or to be attached to connection 106, as shown in FIG. 1) that includes a surface having a hole for connecting to a proximal end of a flushing fluid connector 120.

Additionally, according to embodiments, drain hose connectors and flushing fluid connectors may have various shapes, sizes and lengths so long as a drain hose connector is able to couple with a drain hose and a flushing fluid connector is able to couple with a source of flushing fluid. For instance, an adapter may include a first flushing fluid connector having a proximal end to couple to a source of flushing fluid to flush an inside of a hose, and second drain hose connector having a distal end to couple to the hose, wherein the first connector is coupled to the second connector to provide a flow of the flushing fluid along an axis of the hose.

According to embodiments, various permanent and demountable connections may be used to couple flushing fluid connector (e.g., 120) to a flushing fluid source (not shown), including, by engagement, locking, mounting, securing, indexing, and snapping by thread, clamp, hook, joint, keeper, key, latch, lug, nut, pin, screw, seam, male/female mating, and/or various appropriate connections. For instance, the proximal end of a flushing fluid connector may include one of the above described couplings to a source of flushing fluid, such as a common garden hose, wall spicket, or other connector or fitting including but not limited to ⅜", ½", ¾", and 1" connectors and hose adapters. Thus, as shown in FIG. 1, flushing fluid connector 120 may be coupled to demountable fluid source connector 124 having, for instance, a threaded inner diameter for mating to a threaded outer diameter of a fresh water flushing fluid source (e.g., a common garden hose connected to a spicket).

Additionally, FIG. 1 shows nozzle 122 connecting flushing fluid connector 120 to intermediate connector 110, and for providing a flow of flushing fluid through the drain hose connector 102 and to the drain hose (not shown). According to embodiments, a flushing fluid connector may include a nozzle to produce a high velocity flushing stream of the flushing fluid into the hose. Also, according to embodiments, a flushing fluid connector may include a nozzle to produce a high pressure flow of flushing fluid into the hose. Thus, it is possible to use a high velocity stream and/or high pressure flow of flushing fluid to more effectively flush residue or blockages out of the hose. Particularly, a high velocity or pressure flow can be used to form an area in the hose having highly pressurized flushing fluid in order to "blow out" or force out a blockage or large piece or section of residue in the drain hose. Also, nozzle 122 may include a removable connection such as by threading and/or other removable coupling, as described above with respect to flushing fluid connector 120.

Moreover, according to embodiments, the flushing fluid source connector includes a seal 128 to provide a fluid leak resistant connection between the flushing fluid source and the adapter. Instances of seals include rings, gaskets, washer, diaphragm, and fitting made of rubber, metal, plastic, silicon, silk, and composites. Thus, the representation in FIG. 1 shows flushing fluid connector 120 having demountable fluid leak resistant fluid source connector 124 for connecting apparatus 100 to a flushing fluid source. Additionally, flushing fluid connector 124 may include an annular device and/or sealing device such as a rubber seal for assuring a liquid tight seal between flushing fluid connector 124 and a flushing fluid source such as a garden hose or other source of liquid.

According to embodiments, a "fluid leak resistant" connection (e.g., the flushing fluid connector 120 connection to a flushing fluid source, and/or the drain hose connector 102 connection to a drain hose to be flushed) provides a strong enough connection so that the hose can be manipulated, picked up, rotated, shaken, and squeezed during flushing of the drain hose, without the connection becoming disconnected or leaking more than, for instance, a cup or two of fluid (e.g., flushing fluid, residue, and/or blockage) during flushing of the hose.

According to embodiments, the flushing fluid connector may include a control valve to adjust a flow rate of the flushing fluid over a range between off and full flow. For instance, FIG. 1 also shows flushing fluid connector 120 including a control valve or switch 126 for adjusting the flow of the flushing fluid to on, off, or in a range between on and off. Moreover, in order to flush out the drain hose, according to embodiments, various flushing fluids such fluids and liquids may be used, including for instance, water, soap, detergent, acid, base, oil, solid particles, abrasive particles, gas, and pressurized gas.

In addition, in accordance with embodiments, various permanent and demountable connections may be used to couple drain hose connector (e.g., 102) to a drain hose to be flushed (not shown), including, by engagement, locking, mounting, securing, indexing, and snapping by thread, clamp, hook, joint, keeper, key, latch, lug, nut, pin, screw, seam, male/female mating, and/or various appropriate connections. For instance, the distal end of a drain hose connector may include one of the above described couplings to a drain hoses used to drain black and/or gray water holding tanks that receive and retain waste water from sinks, bathtubs, showers, and toilets of recreation vehicles, motor homes, travel trailers, campers, airplanes, and boats.

More specifically, a drain hose connector may include a coupling to a three inch end of a flexible tube or accordion shaped black water drain hose or black and gray water drain hose adapted to mate with the main dump outlet connector of the black and/or gray water waste water tanks. Similarly, for instance, a drain hose connector may include a coupling to a one and-a-half inch end of a flexible tube or accordion shaped gray water drain hose adapted to mate with the main dump outlet connector of a gray water waste water tank. For instance, according to FIG. 1, drain hose connector 102 may be an annular connector with pins 104 extending from the outer diameter of the connector to form a demountable coupling via pins 104 in connection with a 4 pin threaded female portion of a drain hose (not shown). Also, pins in the distal end of the drain hose connector 102 (e.g., 4 pins 104) can be locked to a four hook receptor of the drain hose by mating the hose hooks to the connector pins and twisting the hose or connector so that the four pins are hooked and locked to the four hooks of the receptor. Similarly, drain hose connector may be an annular connector including a male or female threaded portion for connecting to a female or male threaded portion of a drain hose (not shown), by for instance twisting the drain hose or adapter so that the threaded portions hook and thread together to form a seal.

Moreover, according to embodiments, the drain hose connector includes a seal 108 to provide a fluid leak resistant connection (for example, as described above with respect to flushing fluid connector 120) between the drain hose and the adapter. Seals used for this purpose may include rings, gaskets, washer, diaphragm, and fitting made of rubber, metal, plastic, silicon, silk, and composites. Thus, the representation in FIG. 1 shows drain hose connector 102 including annular demountable drain hose connection 106 to form a fluid leak resistant drain hose connection. For instance, demountable drain hose connector 106 may be lined or coated or rimmed with a rubber seal or other device (e.g., such as at seal 108) for assuring a liquid tight seal between the drain hose flush adapter and the drain hose. As a result, a flexible accordion type three inch drain hose may have four female threaded inputs so that it can be pushed and rotated into a locking position over four pins 104 extending radial outward from the exterior of drain hose connector 102 to form the fluid leak resistant connection.

Figure 2:
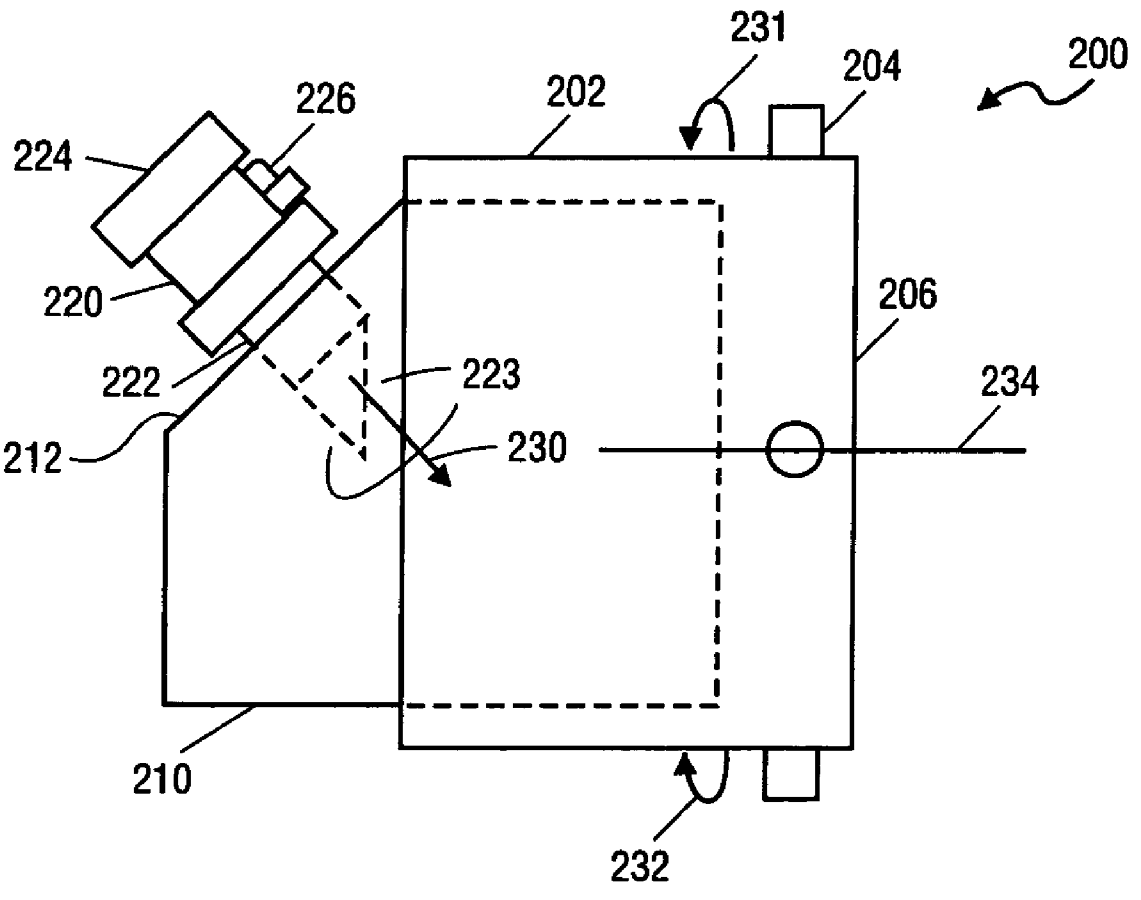
FIG. 2 is an illustration of a drain hose flush adapter for providing a flow of flushing fluid at an angle with respect to the axis of a drain connected hose.

FIG. 2 is an illustration of a drain hose flush adapter for providing a flow of flushing fluid at an angle with respect to the axis of a connected drain hose. As shown in FIG. 2, drain hose flush adapter 200 includes drain hose connector 202 coupled to flushing fluid connector 220 via intermediate portion 210. Connected to drain hose connector 202, FIG. 2 shows intermediate connector 210 including angled surfaced 212 for connecting to flushing fluid connector 220 so that flushing fluid connector provides fluid flow at an angle with respect to the axis of a drain hose connected to the drain hose connector 202. Also, according to embodiments, an adapter provides a flow of flushing fluid at an angle with respect to an axis of the drain hose to be flushed (e.g., providing a flow in a direction other than along an axis of the drain hose, in a direction off axis of the drain hose, in a direction transverse to the axis of the drain hose) to more effectively flush residue or blockages out of the drain hose. For example, drain hose connector 202 may be coupled to flushing fluid connector 220 via an intermediate portion that is bent so that the axis of the drain hose connector is oriented at an angle with respect to the axis of the flushing fluid connector.

According to embodiments, various permanent and demountable connections may be used to couple flushing fluid connector (e.g., 220) to a flushing fluid source (not shown), including, those as described above with respect to the connections for 120 of FIG. 1. Thus, as shown in FIG. 2, flushing fluid connector 220 may include demountable fluid source connector 224 for connecting with a source of flushing. More particularly, demountable flushing fluid connector 224 can have a threaded inner diameter for mating to a threaded outer diameter of a fresh water flushing fluid source (e.g., a common garden hose connected to a spicket).

Additionally, FIG. 2 shows nozzle 222 connecting flushing fluid connector 220 to intermediate connector 210 at angled surfaced 212, and for providing a flow of flushing fluid through the drain hose connector 202 and to the drain hose (not shown) at an angle with respect to the axis of a drain hose connected to the drain hose connector 202. Moreover, according to embodiments, a nozzle may include a tapered output. For example, nozzle 222 may include tapered output 223 with respect to the axis of nozzle 222.

In addition, according to embodiments, an adapter may include a control to adjust the angle of flow of flushing fluid with respect to the axis of the drain hose. For instance, flushing fluid connector, intermediate connector, or drain hose connector may include a control, bearing, or other rotational coupling so that the angle of flow of flushing fluid 230 can be adjusted with respect to the axis of the drain hose. More specifically, for instance intermediate connector 210 may be rotationally adaptably coupled to drain hose connector 202 to allow intermediate connector 210 to rotate (e.g., such as is shown by arrows 231 and 232) on axis 234 of its coupling with drain hose connector 202.

According to embodiments, a flushing fluid connector may include a nozzle to produce a high velocity flushing stream of the flushing fluid into the hose, as described above with respect to flushing streams produced by 122 of FIG. 1. Also, according to embodiments, a flushing fluid connector may include a nozzle to produce a high pressure flow of flushing fluid into the hose, as described above with respect to the flow produced by 122 of FIG. 1. Thus, it is possible to provide a high velocity stream of flushing fluid, at an angle with respect to the axis of the drain hose, to more effectively flush residue or blockages out of the hose by focusing a high velocity flushing fluid stream towards one side (e.g., the side that nozzle 222 is angled towards) of the inside of the drain hose (e.g., by using the invention shown in FIG. 2). Additionally, embodiments include a nozzle having a bent portion, an angled discharge, or a hydro directing shaped to direct flushing fluid flow at an angle with respect to the axis of a drain hose. On the other hand, according to embodiments, a nozzle may be configured as described above so that the flow of flushing fluid is in a direction in line with the axis of the drain hose. Also, according to embodiments, a nozzle may include a removable connection to an angled surface (e.g., 212) of an intermediate connector, such as the removable connection as described above with respect to 122 of FIG. 1.

Moreover, flushing fluid source connector 220 may include a seal to provide a fluid leak resistant connection between the flushing fluid source and the adapter, as described above with respect to 120 and 124 of FIG. 1. Consequently, flushing fluid connector 220 may include a strong enough connection to a flushing fluid source so that the hose can be manipulated, picked up, rotated, shaken, and squeezed during flushing of the drain hose, without the connection becoming disconnected or leaking, as described above with respect to connection of 120 of FIG. 1.

According to embodiments, the flushing fluid connector may include a control valve to adjust a flow rate of the flushing fluid over a range between off and full flow. For instance, FIG. 2 shows flushing fluid connector 220 including a control valve or switch 226 for adjusting the flow of the flushing fluid to on, off, or in a range between on and off. Moreover, in order to flush out a drain hose connected to adapter 200, various flushing fluids such as described above with respect to FIG. 1 may be used.

In addition, in accordance with embodiments, various permanent and demountable connections may be used to couple drain hose connector (e.g., 202) to a drain hose to be flushed (not shown), including, connections described above with respect to 102 of FIG. 1. Thus, as shown in FIG. 2, drain hose connector 202 may include demountable drain hose connector 206 having pins 204 extending radially outward from demountable drain hose connector 206 for attaching to a black and/or gray water drain hose; as described with respect to connections of 102, 104, and 106 of FIG. 1.

Moreover, drain hose connector 202 may include a seal to provide a fluid leak resistant connection between the flushing fluid source and the adapter, as described above with respect to seals of 102 of FIG. 1. Consequently, drain hose connector 202 may include a strong enough connection to a drain hose so that the drain hose can be manipulated, picked up, rotated, shaken, and squeezed during flushing of the drain hose, without the connection becoming disconnected or leaking; as described above with respect to connection of 102 of FIG. 1.

According to embodiments, a drain hose flush adapter (e.g., 100 and 200) may be constructed of a singular piece of substance (e.g., formed, for example, of a single piece of injection molded Acrylonitrile Butadeine Styrene (ABS)) or may be made up of multiple pieces (e.g., such as the components described above with respect to FIGS. 1 and 2) made of various substances, such as, ABS, rubber, metal, plastic, polycarbon, fiberglass, and composites thereof, that are attached, connected, screwed, epoxied, glued, or pieced together as appropriate in the art.

SYSTEM AND METHOD OF USE

According to embodiments, after draining or "pumping" of a waste water tank, or in the case when the drain hose used to drain the tank becomes blocked, the drain hose can be disconnected from the tank and flushed or cleaned by using the adapter to rinse residue in the hose from the end that connects to the vehicle, towards the end that connects to the dump station inlet (e.g., by rinsing the residue or blockages towards or into the dump station inlet).

For example, after disconnecting the black and/or gray water drain hose from the tank of a recreational vehicle, the drain hose may be connected to the adapter, which is in turn connected to a source of flushing fluid, as described above with respect to the connections of FIGS. 1 and 2. Then, any residue or blockages in the hose can be rinsed by the flushing fluid from the end that connects to the vehicle towards the end that connects to the dump station inlet. Note that according to embodiments, connecting the adapter to the source of flushing fluid and/or connecting the adapter to the drain hose can be done in any order or simultaneously.

In addition, embodiments include manipulation of the hose (e.g., picked up, rotated, shaken, and squeezed by the user or operator of the apparatus) to complete the flushing easy and convenient, with less risk of an unsanitary and unpleasant mess. Thus, for example, a dump station drain hose (e.g., a three inch flexible tube and/or accordion shaped hose) can be connected to the adapter, such as by mating the drain hose connector annular pins extending from the outer diameter of the connector to the female threaded portion of the drain hose to form a liquid tight seal. Then, the adapter flushing fluid connector can be attached to a source of flushing fluid (e.g., a liquid such as water from a garden hose), such as by rotating a threaded garden hose into the threaded flushing fluid connector. The flushing fluid source can then be activated (e.g., by turning on the garden hose water tap). According to embodiments, including a control valve, the control valve can be adjusted so that the flow rate of the flushing fluid is at a desired flow (e.g., full flow). According to embodiments, the seals at the adapter to drain hose connection, adapter to flush fluid source connection, connections within the adapter (e.g., the nozzle to intermediate portion connection), or other connections (e.g., the garden hose to garden hose tap connection) can be checked before, during, or after activating the flushing fluid source, and/or before, during, or after activating the control valve flow.

Moreover, according to embodiments, the position of the drain hose being flushed can be manipulated to assist in the flushing or cleaning of residue or blockages in the hose. Instances of manipulating the drain hose to assisting in rinsing or flushing the hose include by lifting/picking up, rotating, shaking, and squeezing all or a section of the hose while adjusting the amount of flushing fluid flowing through the drain hose. Thus, in the example described above, the drain hose can be lifted, rotated, shaken, and/or squeezed to manipulate the drain hose while garden hose water is running at full flow through the drain hose, and while the flow of garden hose water is being adjusted between more flow and less flow by the flow control valve. Consequently, according to embodiments, the control valve can be used to adjust the flow rate of the flushing fluid over a range between off and full flow during manipulation of the hose comprises adjusting the flow rate during the flushing.

For example, the end of the hose mated with the flushing fluid connector can be lifted (e.g., such as in direction 144, as shown in FIG. 1) so that gravity helps the residue or blockages in the drain hose flow more easily down towards the drain hose end that connects to the dump station inlet. Also, the drain hose can be rotated (e.g. such as is shown by arrows 141 and 142 with respect to axis 140 of a drain hose attached to connection 106, as shown in FIG. 1) while the flushing fluid is flowing through it, to assist in flushing all internal surfaces equally and more effectively due to the transverse/non-axial movement of the substance. Particularly, once flushing fluid is in the tube, the flushing fluid source could be turned off (e.g., at the flushing fluid source, or by adjusting the control valve so that the flow rate of the flushing fluid is at the lowest flow (e.g., flow is off) and the drain hose then rotated (e.g., rolled about its axis) back and forth to agitate blockages, particles, and residue.

Additionally, according to embodiments, the drain hose may be manipulated by more than one of techniques described above at the same time. Thus, for instance, the drain hose could be lifted, rotated, bent and squeezed while adjusting the amount of flushing fluid flowing through the drain hose to assist in rinsing or flushing the drain hose.

According to embodiments, the adapter, system, and method of use described above for flushing out a drainage hose can be used to clean drain hoses used to drain the holding tanks or recreation vehicles, motor homes, travel trailers, campers, airplanes, and boats.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. An adapter comprising:

a conduit with only one inlet and only one outlet, the inlet and outlet at opposing ends of the conduit;

the inlet having a proximal end with a sufficient inner diameter to receive a volume of flushing fluid from a source of flushing fluid to flush an inside of a flexible hose;

the outlet having a distal end including an outer diameter and pins extending from the outer diameter to demountably couple to the hose, the outer diameter sufficient to provide a fluid leak resistant connection between the hose and the adapter;

wherein the inlet is coupled to the outlet at an angle to provide a flow of the volume of flushing fluid in a direction at an angle with respect to an axis of the outlet and the hose.

2. The adapter of claim 1, wherein the inlet further comprises a nozzle to provide a flow of the flushing fluid in a direction at an angle with respect to an axis of the hose.

3. The adapter of claim 2, wherein the nozzle comprises one of a bent portion, an angled discharge, and a hydro directing shape to direct said flushing fluid.

4. The adapter of claim 1, wherein the inlet further comprises an angled surface with respect to the axis of the hose, to couple the source of flushing fluid to the adapter at an angle with respect to the axis of the hose.

5. The adapter of claim 1, wherein the inlet to couple to a source of flushing fluid further comprises a threaded portion for demountable coupling.

6. The adapter of claim 1, wherein the inlet further comprises a control valve to adjust a flow rate of the flushing fluid over a range between off and full flow.

7. The adapter of claim 1, wherein the distal end of the outlet further comprises an outer diameter and four pins extending from the outer diameter.

8. The adapter of claim 1, wherein the adaptor is comprised of one of Acrylonitrile Butadeine Styrene, plastic, rubber, and metal.

9. The adapter of claim 1, wherein the distal end of the outlet further comprises a seal to provide the fluid leak resistant connection between the hose and the adapter.

10. An adapter comprising:

a first connector having a proximal end to receive a volume of flushing fluid from a source of flushing fluid to flush an inside of a flexible hose;

a second connector having a distal end including an outer diameter and pins extending from the outer diameter to demountably couple to the hose, the second connector to provide a fluid leak resistant connection between the hose and the adapter;

wherein the first connector is coupled to the second connector to provide a flow of the volume of flushing fluid in a direction at an angle with respect to an axis of the hose, and the first connector further comprises a control to adjust the rotation of the flow of flushing fluid around the axis of the inside of the hose.

11. An adapter comprising:

a first connector having a proximal end to couple to receive a volume of flushing fluid from a source of flushing fluid to flush an inside of a flexible hose;

a second connector having a distal end including an outer diameter and pins extending from the outer diameter to demountably couple to the hose, the second connector to provide a fluid leak resistant connection between the hose and the adapter;

wherein the first connector is rotationally adaptably coupled to the second connector to provide a flow of the volume of flushing fluid in a direction at an angle with respect to an axis of the hose, and to allow the first connector to rotate on an axis of its coupling with the second connector.

12. A hose flushing system comprising:

a first connector coupled to a second connector and having a proximal end to form a demountable fluid leak resistant connection to receive a volume of a flushing fluid from a source of flushing fluid to provide a flow of the flushing fluid along an axis of a hose to flush an inside of the hose;

the second connector having a distal end to form a demountable fluid leak resistant connection to the hose to provide the volume of the flushing fluid to the inside of the hose;

wherein the hose flushing system is designed to be lifted and rotated with respect to the axis of the during the flushing, wherein the first connector further comprises a control valve to adjust a flow rate of the flushing fluid over a range between off and full flow and wherein the manipulating comprises adjusting the flow rate during the flushing.

13. The system of claim 12, further comprising hose that is for draining a waste water tank of one of a recreational vehicle, a motor home, and a travel trailer vehicle is connected to the second connector and the flushing system is designed to be manipulated with the hose by one of lifting a portion of the hose, rotating a portion the hose, shaking a portion of the hose, and squeezing a portion of the hose during the flushing.

14. The system of claim 12, wherein the proximal end of the first connector further comprises a threaded inner diameter to couple to a threaded outer diameter of the flushing fluid source.

15. The system of claim 12, wherein the distal end of the second connector further comprises an outer diameter and pins extending from the outer diameter to couple to a receptor of the hose.

16. The system of claim 12, wherein the first connector further comprises a control to adjust an angle of flow of the flushing fluid with respect to the inside axis of the hose.

17. A system comprising:

means for demountably coupling and sealing an inlet proximal end of a conduit with one inlet and one outlet to a source of flushing fluid to flush an inside of a hose with a volume of fluid received at the inlet, the proximal end perpendicular to and having an opening coaxial with an axis of the outlet;

means for demountably coupling and sealing the outlet to a distal end of the hose, the outlet including an outer diameter and pins extending from the outer diameter;

means for providing a controlled flow rate over a range between zero flow and a flow equal to the volume of fluid received at the inlet along an axis of the inlet, the outlet, and the hose to flush the inside of the hose.

18. An adapter comprising:

a conduit with one inlet and one outlet;

the inlet having a proximal end with an inlet opening having sufficient diameter to receive a volume of flushing fluid from a source of flushing fluid to flush an inside of a flexible drain hose that is for draining a waste water tank of one of a recreational vehicle, a motor home, and a travel trailer vehicle, the inlet opening coaxial with an axis of the source;

the outlet having a distal end including an outer diameter and pins extending from the outer diameter to demountably couple to the flexible, the outlet having an outlet diameter sufficient to provide a fluid leak resistant connection between the flexible drain hose and the outlet; and wherein the inlet opening and outlet opening are coaxially coupled to provide a flow of the volume of flushing fluid along the axis of the flexible drain hose, wherein the first connector further comprises a control valve to adjust a flow rate of the flushing fluid over a range between off and full flow and wherein the manipulating comprises adjusting the flow rate during the flushing.

19. The adapter of claim 18, wherein the flexible drain hose has a length of at least four feet.

20. The adapter of claim 18, wherein the flexible drain hose is designed to connect to a main dump outlet connector of one of a recreational vehicle, a motor home, and a travel trailer vehicle.

21. The adapter of claim 18, wherein the flexible drain hose includes one of plastic and rubber.

* * * * *